United States Patent [19]

Takahashi et al.

[11] Patent Number: 5,464,593
[45] Date of Patent: Nov. 7, 1995

[54] PROCESS FOR PRODUCING SPHERICAL ZEOLITE CATALYST AND APPARATUS FOR PRODUCING THE SAME

[75] Inventors: Kazuo Takahashi; Fumio Kumata; Hitoshi Nozaki; Shinichi Inoue; Toshiji Makabe, all of Kanagawa, Japan

[73] Assignees: Mitsubishi Oil Co., Ltd., Tokyo; Chiyoda Corporation, Yokohama, both of Japan

[21] Appl. No.: 273,874

[22] Filed: Jul. 12, 1994

Related U.S. Application Data

[62] Division of Ser. No. 849,346, Mar. 11, 1992, Pat. No. 5,362,696.

[30] Foreign Application Priority Data

Mar. 11, 1991 [JP] Japan ........................ 3-70611
May 21, 1991 [JP] Japan ........................ 3-146756

[51] Int. Cl.$^6$ ........................ B01J 20/18; B01J 29/06
[52] U.S. Cl. ........................ 422/224; 422/129; 422/261; 222/420; 502/8
[58] Field of Search ........................ 422/224, 129, 422/216, 225, 261, 243, 223; 502/8, 9, 70, 64; 222/420, 565

[56] References Cited

U.S. PATENT DOCUMENTS

| | | | |
|---|---|---|---|
| 2,384,943 | 9/1945 | Marisic | 502/8 |
| 2,397,326 | 3/1946 | Payne et al. | 502/8 |
| 2,457,091 | 12/1948 | Schlesman | 502/5 |
| 2,492,167 | 12/1949 | Marisic et al. | 50/8 |
| 2,496,396 | 2/1950 | Kassel | 502/8 |
| 2,584,286 | 2/1952 | Pierce et al. | 502/8 |
| 2,665,258 | 1/1954 | Lebeis, Jr. | 502/8 |
| 2,773,840 | 12/1956 | Drew | 502/8 |
| 2,865,867 | 12/1958 | Van Dyke et al. | 502/9 |
| 3,077,388 | 12/1963 | Elrick et al. | 502/8 |
| 3,296,151 | 1/1967 | Heinze et al. | 502/8 |
| 3,520,828 | 7/1970 | Rosinski | 502/70 |
| 3,894,964 | 7/1975 | Roebke et al. | 502/9 |
| 3,960,772 | 6/1976 | Fort et al. | 502/8 |
| 4,198,318 | 5/1980 | Stowell et al. | 502/8 |

FOREIGN PATENT DOCUMENTS

| | | |
|---|---|---|
| 0015801 | 9/1980 | European Pat. Off. . |
| 2527197 | 11/1983 | France . |
| 3617002 | 9/1938 | Japan . |
| 264113 | 12/1943 | Japan . |
| 52-14720 | 4/1977 | Japan . |
| 54-163798 | 12/1979 | Japan . |
| 55-29930 | 8/1980 | Japan . |
| 1-16771 | 3/1989 | Japan . |
| 787934 | 12/1957 | United Kingdom . |
| 2149768 | 6/1985 | United Kingdom . |

*Primary Examiner*—Robert J. Warden
*Assistant Examiner*—Hien Tran
*Attorney, Agent, or Firm*—Sughrue, Mion, Zinn, Macpeak & Seas

[57] ABSTRACT

A process for producing a spherical zeolite catalyst is disclosed, which comprises dropping a zeolite-containing alumina sol into a surfactant-containing oil phase from a dropping opening directly or through air to thereby form spherical droplets of the sol, and then allowing the droplets to gel in an aqueous alkaline solution phase underlying the oil phase and withdrawing the thus gelled droplets, said dropping of the sol being conducted while the dropping opening is being impulsed to thereby impart a spherical and uniform shape to the resulting zeolite particles containing alumina as a binder, and a novel apparatus therefor.

9 Claims, 2 Drawing Sheets

PROCESS FOR PRODUCING SPHERICAL ZEOLITE CATALYST AND APPARATUS FOR PRODUCING THE SAME

This is a divisional of application Ser. No. 07/849,346 filed Mar. 11, 1992 now U.S. Pat. No. 5,362,696.

FIELD OF THE INVENTION

The present invention relates to a process for producing a spherical zeolite catalyst having high strength and to a novel apparatus for producing the catalyst.

BACKGROUND OF THE INVENTION

Spherical particles of alumina, silica, silica-alumina, zeolite, and the like are extensively used, for example, as catalyst supports, drying agents, and adsorbents in the chemical industries, including petroleum chemistry and petroleum refining. When used as a catalyst, spherical particles having diameters of about from 0.5 to 5 mm are packed in a reactor called a fixed bed or moving bed. Because of their spherical shape, the particles readily flow, making charging and discharging of the catalyst easy. Further, since such a spherical catalyst is charged uniformly, no particular technique is required for the charging, and channelling or abnormal flow is less apt to occur during reaction, which contributes to safe operation. For use in the moving bed reactors which are of the type in which a catalyst bed gradually moves downward due to its own weight, an essential requirement of the catalyst particles is a spherical shape.

Such spherical catalysts are produced by a "dropping-into-oil" method as described, for example, in JP-B-26-4113, JP-B-54-163798, JP-B-38-17002 and JP-B-11-6771, or by a "rolling-and-moving" method as described, for example, in JP-B-52-14720 and JP-B-55-29930. (The term "JP-B" as used herein means an "examined Japanese patent publication".)

The dropping-into-oil method can produce spherical particles which are relatively uniform and nearly truly spherical. The rolling-and-moving method yields spherical particles which have a broad diameter distribution and are not so truly spherical, but this method is being extensively employed because of the low production costs involved. Spherical particles for use in moving beds are required not only to descend by their own weight, but to have such properties or performances as uniform size, a nearly true spherical shape, surface smoothness, high strength, high abrasion resistance and the like, because the catalyst is transferred in an air stream for regeneration. For this reason, the spherical particles for use as moving bed catalysts have been produced by the dropping-into-oil method.

In producing a spherical alumina catalyst by the conventional dropping-into-oil method, a reagent which decomposes at high temperatures to evolve ammonia, such as hexamethylenetetramine or urea, is used, and an alumina sol is caused to gel by alkalinity. It is, therefore, necessary, according to this method, that an alumina sol be dropped into a high-temperature oil having a temperature close to 100° C. and that the resulting sol droplets be aged for as long as more than 20 hours. After being thus aged in the oil and then washed, the resultant particles are required to further undergo a post-treatment in which they are immersed in an aqueous solution of ammonium chloride or in ammonia water for several hours in order to increase their strength. If a spherical zeolite catalyst containing alumina as a binder is to be produced by this method, a long gelation time is required and this causes a problem in that the particles being produced are prone to coalescence, deformation, or breakage, leading to a low product yield. In addition, since the only technique for controlling the droplet diameters is to change the diameter of the dropping opening, it has been difficult to freely control droplet diameters and to cope with any viscosity change of the raw material due to a change in zeolite proportion. Furthermore, although spherical zeolite catalysts are required to contain a zeolite, the active ingredient, in a proportion as high as possible in order to have a high catalytic activity per unit weight, there is the problem that the larger the zeolite content, the lower the catalyst particle strength.

SUMMARY OF THE INVENTION

The present inventors have made extensive studies in order to eliminate the above-described problems. As a result, they have succeeded in developing a dropping-into-oil method by which a spherical zeolite catalyst having high strength can easily be produced in a large quantity and high yield within a short time period, and also succeeded in developing a zeolite particle-drying technique and a spherical zeolite catalyst-producing apparatus for practicing the above method. The present invention has been completed based on the above.

Accordingly, the present invention provides, in one aspect thereof, a process for producing a spherical zeolite catalyst, which comprises dropping a zeolite-containing alumina sol into an oil phase from a dropping opening directly or through air to thereby form spherical droplets of the sol, and then allowing the droplets to gel in an aqueous alkaline solution underlying the oil phase, the dropping of the sol being conducted while the dropping opening is being impulsed to thereby impart a uniform shape to the resulting zeolite particles containing alumina as a binder.

The present invention further provides, in another aspect thereof, an apparatus for producing a spherical zeolite catalyst, which comprises a reaction vessel for containing an oil phase as an upper layer and an aqueous alkaline solution phase as a lower layer, a dropping means having a dropping opening for feeding a raw material to the reaction vessel (liquid tank), and an impulse generating means or "knocker" for impulsing the dropping opening. The impulse generating means or "knocker" employed is not particularly limited in construction thereof so long as it functions to give a constant-strength impulse to the dropping opening at regular time intervals.

DETAILED DESCRIPTION OF THE INVENTION

Figure 1:
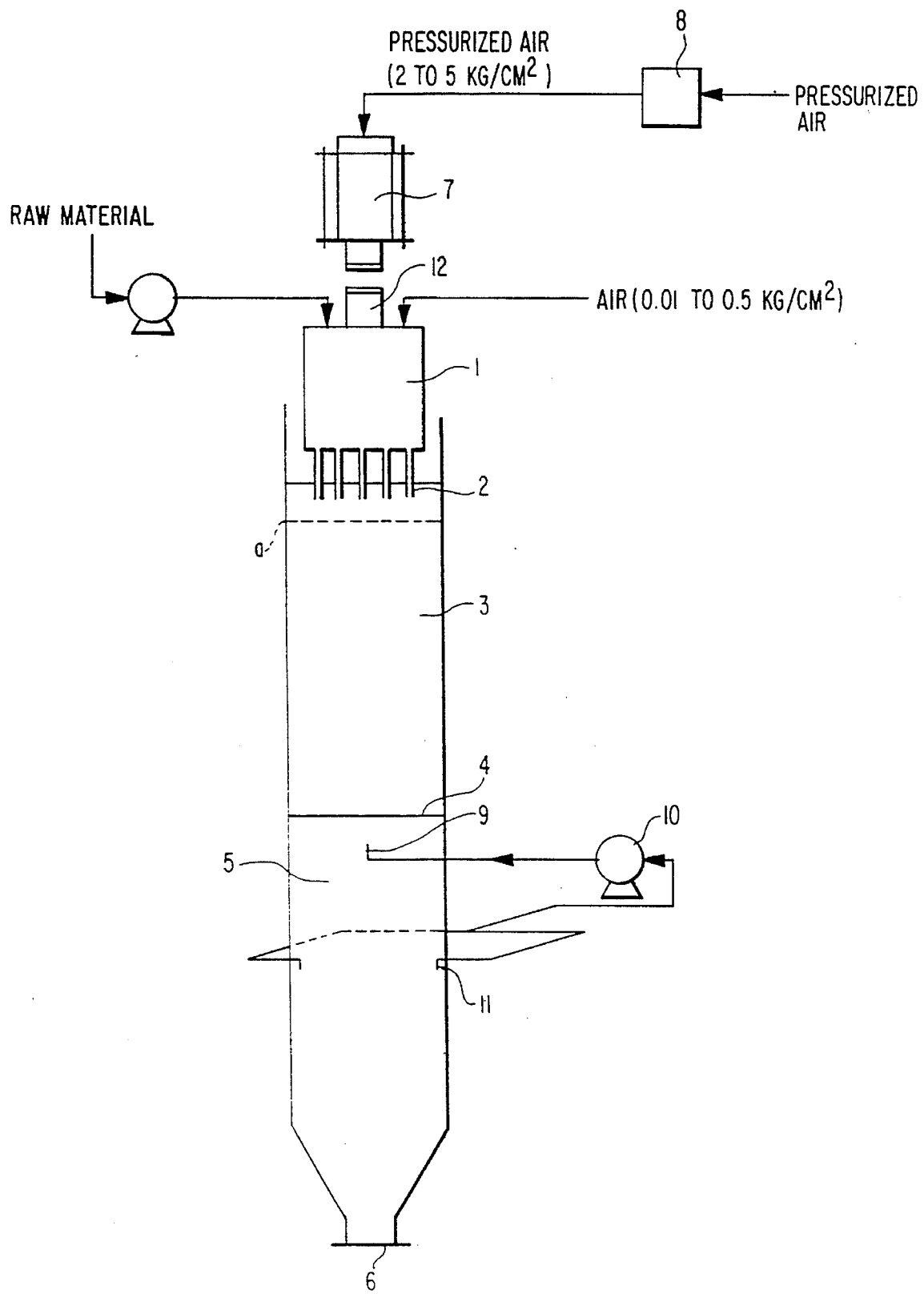
FIG. 1 is a diagrammatic front view of one embodiment of the apparatus of the present invention for producing a spherical zeolite catalyst wherein 1 donates a raw material tank, 2 donates dropping openings, 3 donates an oil phase, 4 donates an interface between an oil phase and an aqueous alkaline solution phase, 5 donates an aqueous alkaline solution phase, 6 donates an outlet, 7 donates an impulse generating means, 8 donates an impulse generating regulator (or pressure regulator), 9 donates a spout, 10 donates an aqueous alkaline solution circulating pump, 11 donates a suction port, 12 donates an impulse receiving means, and a donates a surface in a case where droplets are dropped through air.

The construction and effects of the present invention are explained below with reference to FIG. 1.

Raw material fed from a raw material tank 1 is dropped into an oil phase 3 through dropping openings 2. The raw material-dropping means has been provided thereover with an impulse generating means or "knocker" 7, which impulses the dropping openings; in FIG. 1, the impulse generating means or "knocker" 7 is actuated by pressurized air from the impulse generating regulator 8. The impulse strength and interval between impulses are properly determined according to the properties of the raw material sol. After the dropping into the oil, the resulting droplets (not shown) of the zeolite-containing alumina sol descend through the oil phase while becoming spherical. The sol droplets that have become spherical pass through an interface 4 between the oil phase and an aqueous alkaline solution phase 5 to enter the aqueous alkaline solution phase. The droplets further descend through the aqueous alkaline solution phase, which is typically water which has been rendered alkaline, while gradually gelling and solidifying from the surfaces thereof, and the solidified particles are withdrawn from outlet 6 at the bottom of the reaction vessel.

In the case where the raw material sol is dropped from the dropping openings 2 of the nozzles into the oil phase directly or through air without impulsing the openings, the resulting gel droplets have a certain diameter which is determined by the interfacial tension between the raw material sol and the oil phase, the adhesion of the sol to the edges of the dropping openings, the density and the viscosity of the sol, and other factors. In this case, it is considered that the droplet size becomes smaller as the interfacial tension becomes higher, the adhesion lower, the density higher, and the viscosity lower. Therefore, a change in the properties of the raw material results in a change in droplet diameter. Changes in raw material properties can be attended to by impulsing the dropping openings. For example, if the viscosity of the raw material increases, a constant droplet diameter can be maintained by increasing the strength of the impulses and by extending the intervals between impulses.

In dropping through air, arbitrary range of the distance between the openings and the oil phase is acceptable so long as droplets are not distructed, and it is generally not more than 1 m.

The impulse generating means or "knocker" is not particularly limited in structure so long as it functions to give a constant-strength impulse to the dropping openings at regular time intervals, and any of various kinds of "knockers" may be used. Examples of the "knockers" include an air "knocker" operated by air pressure, a mechanical "knocker" operated by an electric motor, an electromagnetic "knocker" utilizing magnetic force, and the like. When a part of the sol has come out of a dropping opening into the oil or air but is still clinging to the nozzle, the "knocker" impulses the dropping means and the impulse is transferred to the whole nozzle to abruptly vibrate the dropping opening, whereby that part of the sol becomes free and falls by gravity. According to this technique, by suitably setting both the impulse strength for the "knocker" and the impulse intervals, it is possible to form sol droplets having an arbitrary diameter up to the diameter of sol droplets formed by free dropping.

The zeolite-containing alumina sol used as the raw material is not particularly limited so long as spherical droplets can be formed therefrom. However, a preferred example thereof is a zeolite-containing alumina sol which has been prepared by mixing an alumina sol containing from 5 to 30% by weight of boehmite or pseudoboehmite with a zeolite in such proportions as to result in a zeolite content of from 5 to 90% by weight in terms of dry zeolite content in the zeolite-containing alumina sol and which has a viscosity of from 50 to 3,000 cSt. It is preferred to use an alumina zol which has been stabilized using acetic acid ion, chlorine ion, nitrate ion, and the like.

Figure 2A:
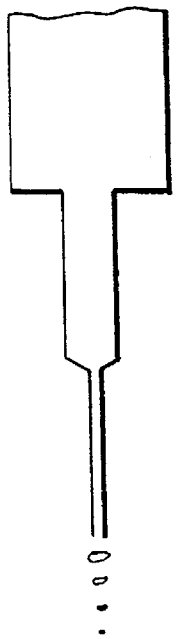
FIG. 2(A) to 2(C) present diagrammatic front views illustrating three kinds of dropping openings that can be employed in the spherical zeolite catalyst-producing apparatus of the present invention.
Figure 2B:
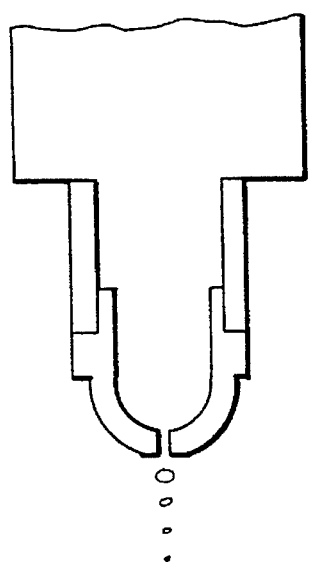
Figure 2C:
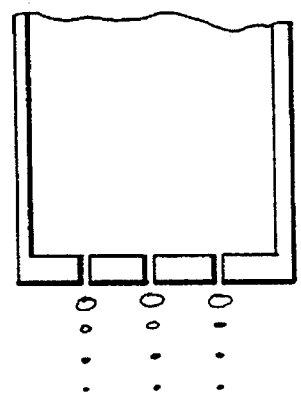

The dropping opening in each nozzle is not particularly limited so long as its horizontal cross section is circular. Exemplary nozzle types include a syringe needle type (FIG. 2(a)), an injection nozzle type (FIG. 2(b)), and a normal opening type (FIG. 2(c)) as shown in FIG. 2, but other various types may be used in the present invention. One of the features of the present invention resides in that dropping of the raw material is independent of the shape of the dropping opening and sol dropping from any of the dropping openings shown in FIG. 2 proceeds satisfactorily. Further, the number of dropping openings can be easily increased, and from several hundreds to several thousands dropping openings may be formed so long as impulse control is possible. The dropping of the raw materials is independent of the dropping opening so long as the dropping opening is circular in cross-section.

It is preferred that the inner diameter of the dropping opening at the tip thereof be in the range of from 0.5 to 3 mm, although this range varies depending on raw material properties and desired particle diameters.

With respect to the properties of the oil, the viscosity and density thereof are important. If the oil has too high a viscosity, sol droplets are deformed before gelling into a perpendicularly extended shape due to the viscosity of the oil. If the oil has too low a density, sol droplets descend at an increased speed, so that they assume a disk form because of increased oil resistance. Therefore, the oil should have a viscosity and density suited for the properties of the sol droplets. In the present invention employing a zeolite-containing alumina sol as the raw material, the preferred ranges of the density and viscosity of the oil phase are from 0.6 to 0.9 g/cm$^3$ and from 1 to 3 cSt, respectively. Specific examples of the oil phase include petroleum fractions such as kerosine and light oil, organic solvents such as hexane, and other various hydrocarbons. The term "oil phase", this simply means an "oil" and preferably a surfactant. The residence time of the droplets in the oil phase is generally 0.5 to 50 seconds for sphering droplets.

Due to the interfacial tension between the oil phase and the aqueous alkaline solution phase, the sol droplets which have descended through the oil phase make a short stop at the interface. Usually, this does not affect particle formation because the droplets stay there only for a short time period in most cases. However, if the droplets stay at the interface for a prolonged time period, there can be the case that gelation begins in those parts of the droplets which are below the interface and in contact with the aqueous alkaline solution phase, so that each droplet gels nonuniformly, and, at the same time, adhesion between droplets occurs on the oil phase side where gelation has not begun, resulting in nonuniform particles. Such problems can be eliminated by adding a surfactant to the oil phase and/or the aqueous alkaline solution phase to lower the interfacial tension between the two phases, thereby enabling the sol droplets to readily pass through the inteface and preventing them from staying there for an unacceptable period of time. For this purpose, any surfactant may be used so long as it enables the droplets of the zeolite-containing alumina sol to pass smoothly through the interface without staying there for an unacceptable period of time. This surfactant may be an oil-soluble surfactant, a water-soluble surfactant, or a combination of both. Various oil-soluble surfactants may be used in the present invention. However, in order to produce spherical zeolite particles for use as a catalyst, the oil-soluble surfactant is preferably a nonionic surfactant which contains no alkali metal or sulfuric acid radicals, is removable by calcination to exert no influence on the product, and has an HLB value of from 3 to 10, preferably from 4 to 7. Further, since the surfactant incorporated in the oil phase also affects the droplets that are descending through the oil phase, a lower surfactant concentration is preferred so long as the smooth passage of the droplets through the interface is possible. Specifically, the preferred range of the surfactant concentration in the oil phase is from 0.01 to 2.0% by weight based on the oil itself. A water-soluble surfactant has the same effect. The term "aqueous alkaline solution phase", this simply means water plus a base and optionally a surfactant.

Another technique for preventing the coalescence or deformation of sol droplets due to their stay at the interface between the two phases is to shake the interface to a proper degree. This also is an effective means. When the interface is being shaken, the sol droplets are kept dispersed at the interface and, at the same time, pass through the interface within a reduced time period due to the vibration of the interface. Shaking of the interface may be attained by stirring the oil phase or alkaline aqueous solution phase at the interface. In the apparatus of FIG. 1, the alkaline aqueous solution phase is circulated in order to shake the interface and also for the purpose of taking out particles that have gelled. In this case, the alkaline aqueous solution phase may be jetted either from a spout 9 disposed near the interface or in a direction parallel or perpendicular to the interface. Alternatively, the liquid tank may be provided with a screw near the interface to mechanically shake the interface by revolving the screw. Other various techniques may be utilized for shaking the interface.

The aqueous alkaline solution phase is preferably one which has a pH value of from 9 to 11 and will not remain on the product. An aqueous solution of ammonia is usually employed as the alkaline aqueous solution phase. Ammonia concentration affects gelation time. If the ammonia concentration is too low, the sol droplets reach the bottom of the tank before the surfaces thereof gel sufficiently, causing the resulting particles to suffer deformation or coalescence. If the ammonia concentration is too high, gelation of each droplet proceeds nonuniformly because only the surface of the droplet gels too quickly, resulting in impaired product strength. A proper range of the ammonia concentration in the aqueous phase is from 0.2 to 20% by weight based on water plus ammonia, with the preferred range thereof being from 2 to 10% by weight based on water plus ammonia.

The apparatus of the present invention for producing a spherical zeolite catalyst is explained below with reference to FIG. 1. This apparatus is characterized as comprising a reaction vessel capable of containing an aqueous alkaline solution phase 5 and an oil phase 3, a nozzle having a dropping opening 2 for dropping a raw material therethrough from a raw material tank 1 into the oil phase in the reaction vessel, and an impulse generating means 7 disposed over the nozzle and having an impulse generating means regulator 8 for regulating impulse strength and impulse intervals. desired, a spout or injection nozzle 9 for jetting the oil phase or aqueous alkaline solution phase may be disposed near the interface 4 between the oil phase and the alkaline aqueous solution phase. In the case where this spout 9 is for jetting the oil phase, it is preferably positioned above the interface between the two phases. Where the spout 9 is for jetting the alkaline aqueous solution phase, it is preferably positioned below the interface. By jetting the oil phase or aqueous alkaline solution phase from the spout, the interface is caused to vibrate up and down and, as a result, sol droplets can be kept dispersed and pass through the interface in a reduced time period. Further, part of the aqueous alkaline solution phase may be circulated and jetted from the spout 9. The spherical particles thus formed in the apparatus of FIG. 1 are withdrawn from outlet 6 of the apparatus at the bottom thereof and then aged in an aqueous alkaline solution for a period of from several minutes to ten-odd (about ten) hours in order to allow gelation to proceed sufficiently. Generally, the aging is conducted at pH of 9 to 11 under atmospheric pressure at normal temperature. The resulting particles are then taken out, dried, and then calcined.

The present invention further provides, according to still another aspect thereof, a process for producing a spherical zeolite catalyst, which comprises dropping a zeolite-containing alumina sol into an oil phase directly or through air to thereby form spherical droplets of the sol, allowing the droplets to gel in an aqueous alkaline solution phase underlying the oil phase, and drying and then calcining the resulting gel particles to thereby obtain a spherical zeolite catalyst containing alumina as a binder, the drying being conducted at a temperature below 100° C. to thereby impart a higher strength and truly spherical and uniform shape to the catalyst particles.

In the above process, the dropping of a zeolite-containing alumina sol into an oil, which is performed directly or through air, may be carried out by any method so long as the dropping method used can form sol droplets having a constant diameter. For example, the zeolite-containing alumina sol may be allowed to freely fall dropwise into an oil phase directly or through air from dropping openings having the same diameter. Alternatively, a technique of mechanically regulating the diameter of sol droplets may be used.

The compositions and properties of the oil phase and aqueous alkaline solution phase for use in forming spherical sol droplets in this process preferably are as described hereinabove.

In the spherical sol droplets, gelation proceeds from the surface to the inner part of each droplet. Although the mechanism of this gelation has not been fully elucidated, it is believed that hydrated aluminum hydroxide undergoes a dehydration condensation to form a polymeric network structure. In each spherical droplet, its surface in contact with the aqueous alkaline solution gels and solidifies relatively rapidly, but gelation of the inner part of the droplet requires more time because the aqueous alkaline solution phase must diffuse into the inner part through spaces within the network structure. Therefore, it is necessary to age and solidify the resulting spherical particles in an aqueous alkaline aging solution for a certain time period in order to prevent the particles from undergoing coalescence or deformation in post-treatment. In the case of spherical particles having a diameter of 1.5 mm, 20 hour aging in a 5% alkaline solution is still insufficient for the gelation of the inner parts of the particles. However, it has been found that complete gelation in an aqueous alkaline solution is unnecessary for the formation of true spherical catalyst particles with high strength and that shorter aging times are preferred so long as the particles do not suffer coalescence or deformation in the subsequent drying. Although the aging time varies depending on the concentration of the aqueous alkaline aging solution, it is generally from 5 minutes to 10 hours, preferably from 30 minutes to 5 hours, when the aqueous solution is 1 to 10% aqueous ammonia. Why shorter aging periods are preferred is not clear, but it can be considered that the aging time may affect the shrinkage of the aged particles in the subsequent drying.

The spherical particles the surfaces of which have gelled and which have solidified to a degree sufficient for avoiding coalescence and deformation are separated from the aqueous alkaline aging solution by filtration, and then dried. In this drying step, the spherical particles gradually shrink, due to loss of water, to a size having a diameter about from $2/3$ to $1/2$ of that before drying and a volume about from $1/3$ to $1/10$ of that before drying. In the drying of an ordinary solid particle, it is considered that the water present around the particle surface first evaporates and the surface becomes dry, the water remaining inside then diffuses to the surface through minute pores, and the inner part is thus dried gradually. In the case drying the spherical particles according to the process of the present invention, it is considered that with the progress of the drying, the water is gradually eliminated and the volume of each particle decreases at a rate corresponding to the water elimination. It is considered to be crucially important that the aluminum hydroxide contained in the particles should be prevented, throughout the drying, from undergoing a chemical change due to a dehydration condensation to form a strong gel structure and to thereby stop the shrinkage of the particles. In order to inhibit this chemical reaction, a lower drying temperature and a shorter drying time are preferred. In order to efficiently eliminate the water from the particles, it is preferred to flow a gas around the particles to reduce the thickness of laminar sublayers so as to lower diffusion resistance as much as possible, and that, as this gas, a low humidity gas obtained by moisture removal should be used for the purpose of increasing, as much as possible, the moisture concentration gradient in the gas phase in contact with the particle surfaces.

The drying gas is preferably an inert gas such as helium, nitrogen, air, carbon dioxide gas, or the like. Of these, helium is most preferred in that the use of helium gas, which is the lowest in viscosity among those gases, results in thin laminar sublayers and, hence, provides the highest drying rate. However, helium is expensive, and dry air is usually sufficient.

The drying is carried out by causing a dry gas regulated to have a low relative humidity to flow around the spherical particles at a temperature below 100° C. to above 0° C. The lower the humidity of the gas, the higher the drying rate. However, a moisture containing gas having a humidity up to around 80% RH can be used if the flow speed of the gas is high. Drying rate increases with increasing drying temperature, because the vapor pressure of water rises from 9 mmHg at 10° C. to 23 mmHg at 25° C. and to 93 mmHg at 50° C. However, since higher drying temperatures accelerate chemical gelation to yield catalyst particles having impaired strength, a proper drying temperature is determined by the required catalyst strength.

In the case where drying is conducted by allowing the spherical particles to stand without a low-humidity gas flow, the drying time is required to be from 8 hours to 2 days at 20° C. and from 2 to 8 hours at 80° C. In contrast, in the case of drying with a low humidity gas flow, the drying time can be reduced greatly, i.e., it is 30 minutes to 2 hours at 20° C. and several minutes to 1 hour at 80° C. Besides achieving such a drying time reduction, the gas flow drying also has the effect of increasing the catalyst strength by about 10 to 20%. It is noted that the conventionally employed drying at temperatures not lower than 100° C. is disadvantageous in that the products have low catalyst strength, although the drying time is short.

Catalyst strength herein means the strength of a catalyst particle as determined with a Kiya-type strength meter. This strength meter measures the crushing strength of a particle and the strength value obtained indicates the load resistance of the particle. In the case of catalyst particles containing alumina as a binder, larger crushing strength values obtained with the strength meter not only indicate higher load resistance, but show higher abrasion and impact resistance. Hence, such crushing strength values are extensively used as a measure of catalyst performance.

As the drying apparatus, use may be made of a batch drying apparatus in which the material to be dried is kept stationary, such as that described in Chemical Engineering Handbook, edited by Chemical Engineering Society, Japan, 1988, p. 673, or a continuous hot air drying apparatus in which the material to be dried is transferred, such as that described on p. 674 of that Handbook. With such apparatus, the spherical particles can be treated in a large quantity within a short time period.

After the drying, the spherical particles are calcined. This calcination may be conducted at 550° C. for 3 hours. Thus, a spherical zeolite catalyst of the present invention is obtained. The shape of each spherical particle changes little through the calcination.

According to the process of the present invention, a spherical zeolite catalyst is produced in significantly improved yield because gelation in an aqueous alkaline solution phase can be conducted at ordinary temperature in a short time period. Further, it has become possible to produce a spherical zeolite catalyst having a high zeolite content and high strength in a large quantity within a short time period.

That is, by impulsing the dropping openings, droplet diameter control has become possible over a wide range of raw material viscosities. Moreover, most especially by adding a surfactant to the oil phase, production of nearly true spherical zeolite particles has become easy. Furthermore, by shaking the interface between the oil phase and the alkali containing aqueous solution phase, further improved product yield and further improved sphericity have been attained.

As a result, it has become possible, according to the process of the present invention, to produce spherical zeolite catalyst particles which are highly precise in size from a wide range of raw materials in high yields within short time periods.

According to the apparatus of the present invention, the process for producing spherical zeolite catalyst particles can be easily practiced under optimum conditions for dropping of the raw material and for shaking of the interface between the two phases and, hence, the above-described effects can easily be brought about.

The present invention will be explained below in more detail with reference to the following examples, but the invention is not construed as being limited thereto.

EXAMPLE 1

Three kinds of mixtures were prepared by mixing a commercially available alumina sol (manufactured by Nissan Chemical Industries, Ltd., Japan) having an alumina content of 10% by weight (based on total sol weight) with a pentasil-type zeolite in such proportions that the resulting mixtures had alumina:zeolite ratios of 30:70, 50:50, and 70:30 by weight, respectively, on a dry basis. The three mixtures are referred to as raw materials A, B, and C, respectively. The viscosities of raw materials A, B, and C were 1,000 cSt, 600 cSt, and 400 cSt, respectively. Each of raw materials A, B, and C was fed separately to the raw material tank as shown in FIG. 1, and dropped directly into an oil by pressurizing the raw material tank. As the nozzles, those having dropping openings of the type as shown in FIG. 2 were used. The dropping openings had an inner diameter of 1 mm. As the impulse generating means, an air knocker manufactured by Hayashi Vibrator, Japan was used. The impulse generating means was regulated to give an impulse at a frequency of 2 times per second. The impulse strength was changed according to raw material viscosity by controlling the air pressure applied thereto. That is, for raw materials A, B, and C, the air pressures applied to the knocker were 2.9 kg/cm$^2$G, 2.6 kg/cm$^2$G, and 2.3 kg/cm$^2$G, respectively.

The liquid phase of a reaction vessel was 1.5 m in length, in which the oil phase was 1 m and the aqueous alkaline phase was 0.5 m. The oil phase (density 0.794 g/cm$^3$ at 15° C. and 1.5 cSt at 30° C.) contained 1.0% by weight (based on oil plus surfactant) of a nonionic surfactant (a polyoxyethylene alkylphenyl ether) having an HLB value of 6. The aqueous alkaline solution phase underlying the oil phase contained 5% by weight of ammonia (based on water plus ammonia). The oil and aqueus phases were normal temperature and normal pressure. The sol droplets resulting from the dropping of each of the zeolite-containing alumina sols descended without staying at the interface (the time at the interface was less than 0.5 second) between the oil and aqueous phases and settled on an accumulation means above the outlet at the bottom of the apparatus, where the shape of each resulting particle was kept spherical and the particles were kept separate. The residence time in the oil phase was 4 seconds. The spherical particles withdrawn from the reaction vessel were aged in 5% aqueous ammonia for 12 hours, subsequently dried by being allowed to stand at 120° C. under ambient pressure for 3 hours, and then calcined at 550° C. under ambient pressure in air for 3 hours. Thus, a spherical zeolite catalyst having a high sphericity degree and high strength was obtained from each of raw materials A, B, and C.

The results of property measurements of the thus-obtained catalysts are summarized in Table 1.

EXAMPLE 2

A raw material mixture was prepared by mixing a commercially available alumina sol (manufactured by Nissan Chemical Industries, Ltd.) having an alumina content of 20% by weight with a pentasil-type zeolite in such proportions that the resulting mixture had an alumina:zeolite ratio of 30:70 by weight on a dry basis. This mixture is referred to as raw material D. The viscosity of raw material D was 800 cSt. The same nozzle and knocker as those in Example 1 were used. The knocker was regulated to give an impulse at a frequency of 2 times per second, and the air pressure applied to the knocker was 2.0 kg/cm$^2$G. The oil used contained 0.5% by weight of a nonionic surfactant (a sorbitan fatty acid ester) having an HLB value of 4. Except the above, the same procedures as in Example 1 were conducted, thereby obtaining a spherical zeolite catalyst having a high sphericity degree and high strength.

EXAMPLE 3

A boehmite alumina powder was added to a commercially available alumina sol (manufactured by Nissan Chemical Industries, Ltd.) having an alumina content of 20% by weight to prepare an alumina sol having an alumina content of 30% by weight. There was mixed therewith a pentasil-type zeolite in such proportions that the resulting mixture had an alumina:zeolite ratio of 50:50 by weight on a dry basis. This mixture is referred to as raw material E. The viscosity of raw material E was 2,000 cSt. The same nozzle and knocker as those in Example 1 were used. The knocker was regulated to give an impulse at a frequency of 1.5 times per second. The air pressure applied to the knocker was 2.5 kg/cm$^2$G. Except for the above, the same procedures as in Example 1 were conducted, thereby obtaining a spherical zeolite catalyst having a high sphericity degree and high strength.

EXAMPLE 4

A boehmite alumina powder was added to a commercially available alumina sol (manufactured by Nissan Chemical Industries, Ltd.) having an alumina content of 20% by weight to prepare an alumina sol having an alumina content of 30% by weight. There was mixed therewith a pentasil-type zeolite in such proportions that the resulting mixture had an alumina:zeolite ratio of 30:70 by weight on a dry basis. This mixture is referred to as raw material F. The viscosity of raw material E was 2,800 cSt. The same nozzle and knocker as those in Example 1 were used. The knocker was regulated to give an impulse at a frequency of 1.5 times per second. The air pressure applied to the knocker was 3.5 kg/cm$^2$G. Except for the above, the same procedures as in Example 1 were conducted, thereby obtaining a spherical zeolite catalyst having a high sphericity degree and high strength.

EXAMPLE 5

The same procedures as in Example 1 were conducted except that raw material A only was used and that in place of the nonionic surfactant, a sodium alkylbenzenesulfonate was added to the aqueous alkaline solution phase in an amount of 0.1% by weight. A spherical zeolite catalyst having a high sphericity degree and high strength was thus obtained.

EXAMPLE 6

The same procedures as in Example 5 were conducted except that raw material A was dropped into the oil through air. A spherical zeolite catalyst having a high sphericity degree and high strength was thus obtained. The distance between the opening and the oil was 30 cm.

COMPARATIVE EXAMPLE 1

Each of raw materials A, B, and C was dropped directly into an oil without giving an impulse to the nozzle by the knocker. As a result, the sol droplets had diameters about two times that of the droplets formed with the application of impulses, and particle diameter control was not attained.

COMPARATIVE EXAMPLE 2

The same procedures as in Example 1 were conducted except that raw material A only was used and no surfactant was added to the oil. As a result, the sol droplets stayed at the interface between the oil and aqueous phases and underwent coalescence. Therefore, the product yield was very low.

each of raw materials A and C was effected by allowing the particles to stand in air on an evaporating disk at 20° C. for 24 hours. Thus, spherical zeolite catalysts having high sphericity degrees and high strengths were obtained.

TABLE 1

|  | Example 1 | Example 2 | Example 3 | Example 4 | Example 5 | Example 6 | Comparative Example 1 | | | Comparative Example 2 |
|---|---|---|---|---|---|---|---|---|---|---|
| Raw material | A | B | C | D | E | F | A | A | A | B | C | A |
| Drying temperature, °C. | 120 | 120 | 120 | 120 | 120 | 120 | 120 | 120 | 120 | 120 | 120 | 120 |
| Drying time, hr | 3 | 3 | 3 | 3 | 3 | 3 | 3 | 3 | 3 | 3 | 3 | 3 |
| Product yield, wt % | 96 | 97 | 96 | 97 | 97 | 96 | 97 | 96 | 98 | 98 | 98 | 62 |
| Average particle diameter, mm | 1.4–1.6 | 1.4–1.6 | 1.4–1.6 | 1.4–1.6 | 1.4–1.6 | 1.4–1.6 | 1.4–1.6 | 1.4–1.6 | 2.8–3.5 | 2.7–3.2 | 2.5–3 | 1.4–1.6 |
| Average strength, kg | 0.9–1.6 | 1.9–3 | 2.4–3.9 | 1.4–2.1 | 2.5–3.6 | 1–1.8 | 0.9–1.7 | 0.8–1.7 | 3.2–4.4 | 4.2–5.7 | 5.1–6.6 | 0.9–1.5 |
| Average sphericity degree | 1.01 | 1.011 | 1.008 | 1.012 | 1.009 | 1.013 | 1.009 | 1.010 | 1.10 | 1.11 | 1.25 | 1.07 |

$$\text{Average particle diameter (mm)} = \frac{\text{sum of particle diameters}}{\text{number of particles?}}$$

$$\text{Average strength (kg)} = \frac{\text{sum of particle strenths}}{\text{number of particles?}}$$

$$\text{Sphericity degree} = \frac{\text{longest diameter}}{\text{shortest diameter?}}$$

EXAMPLE 7

Using each of raw materials A and C, spherical particles that had undergone surface gelation were prepared in the same manner as in Example 1. The spherical particles formed from each of raw materials A and C and withdrawn from the reaction vessel were aged for 2 hours in 5% aqueous ammonia to allow the particles to gel sufficiently, subsequently place in an air flow type drying apparatus, and then dried by introducing air having a humidity of 10% RH under three conditions, i.e., 80° C.—20 minutes, 50° C.—40 minutes, and 20° C.—1 hour. Thereafter, the dry particles were calcined at 550° C. in air for 3 hours, thereby obtaining spherical zeolite catalysts having high sphericity degrees and high strengths. The results of property measurements of these catalysts are shown in Table 2.

EXAMPLE 8

The same procedures as in Example 7 were conducted except that raw material A only was used and drying was conducted at 20° C. for 2 hours using air regulated to have a humidity of 60% RH, thereby obtaining a spherical zeolite catalyst having a high sphericity degree and high strength.

EXAMPLE 9

The same procedures as in Example 7 were conducted except that raw material A only was used, that the aqueous alkaline solution phase employed was one prepared by adding, in place of the nonionic surfactant, 0.1% by weight of a sodium alkylbenzenesulfonate to 8 wt % aqueous ammonia, and drying was conducted at a humidity of 50% RH and a temperature of 50° C. for 1 hour. Thus, a spherical zeolite catalyst having a high sphericity degree and high strength was obtained.

EXAMPLE 10

The same procedures as in Example 7 were conducted except that drying of the spherical particles formed from

COMPARATIVE EXAMPLE 3

The same procedures as in Example 7 were conducted except that drying of the spherical particles formed from each of raw materials A and C was effected at 120° C. for 20 minutes, thereby obtaining spherical zeolite catalysts having high sphericity degrees. The thus-obtained catalysts, however, had strengths as as about half of those of the catalysts obtained through 20° C.—drying in Example 7.

TABLE 2

|  | Example 7 | | | | | | Example 8 | Example 9 | Example 10 | | Comparative Example 3 | |
| --- | --- | --- | --- | --- | --- | --- | --- | --- | --- | --- | --- | --- |
| Raw material | A | A | A | C | C | C | A. | A | A | C | A | C |
| Drying temperature, °C. | 80 | 50 | 20 | 80 | 50 | 20 | 20 | 20 | 20 | 20 | 120 | 120 |
| Drying time, hr | 0.33 | 0.66 | 1 | 0.33 | 0.66 | 1 | 1.5 | 2 | 24 | 24 | 0.33 | 0.33 |
| Product yield, wt % | 98 | 98 | 98 | 98 | 98 | 98 | 98 | 98 | 98 | 98 | 98 | 98 |
| Average particle diamter, mm | 1.5 | 1.5 | 1.5 | 1.5 | 1.5 | 1.5 | 1.5 | 1.5 | 1.5 | 1.5 | 1.5 | 1.5 |
| Average strength, kg | 1.9 | 2.5 | 2.8 | 5.4 | 5.8 | 6.1 | 2.8 | 2.2 | 2.5 | 5.6 | 1.4 | 3.2 |
| Average sphericity degree | 1.010 | 1.008 | 1.010 | 1.012 | 1.010 | 1.011 | 1.008 | 1.005 | 1.007 | 1.007 | 1.008 | 1.008 |

$$\text{Average particle diameter (mm)} = \frac{\text{sum of particle diameters}}{\text{number of particles?}}$$

$$\text{Average strength (kg)} = \frac{\text{sum of particle strenths}}{\text{number of particles?}}$$

$$\text{Sphericity degree} = \frac{\text{longest diameter}}{\text{shortest diameter?}}$$

While the invention has been described in detail and with reference to specific embodiments thereof, it will be apparent to one skilled in the art that various changes and modifications can be made therein without departing from the spirit and scope thereof.

What is claimed is:

1. An apparatus for producing a spherical zeolite catalyst which comprises:

dropping means having at least one opening of a circular cross section for feeding a zeolite-containing alumina sol to a reactor, impulse generating means for applying knocks to the dropping means to form spherical droplets of the zeolite-containing alumina sol, an impulse generating means regulator for regulating the strength of the knocks and the intervals between the knocks, a reactor, where the spherical zeolite catalyst is formed, having an upper part and a lower part, where the upper part of the reactor contains an oil phase which receives the zeolite-containing alumina sol from the dropping means having at least one dropping opening and where the lower part of the reactor contains an aqueous alkaline solution, with an interface between the oil phase and the aqueous alkaline solution, and outlet means at the lower part of the reactor to withdraw the spherical zeolite catalyst;

wherein the impulse generating means gives constant strength knocks to the at least one dropping opening at regular time intervals to form sol droplets having constant diameter.

2. An apparatus as claimed in claim 1, wherein said dropping opening has a diameter of from 0.5 to 3 mm.

3. An apparatus as claimed in claim 1, wherein said reactor has a spout for jetting the oil phase or aqueous alkaline solution thereinto, said spout serving to shake the interface between the oil phase and the aqueous alkaline solution.

4. The apparatus of claim 1, further comprising means located in the lower part of the reactor to shake the interface..

5. The apparatus of claim 4, wherein the means to shake the interface comprises means to remove aqueous solution from the lower part of the reactor and means to jet the thus removed aqueous alkaline solution in the proximity of the interface to thereby shake the interface.

6. The apparatus of claim 1, further comprising means located in the upper part of the reactor to jet the oil phase to thereby shake the interface.

7. The apparatus of claim 1, wherein said impulse generating means is operated by air pressure.

8. The apparatus of claim 1, wherein said impulse generating means is operated by an electrical motor.

9. The apparatus of claim 1, wherein said impulse generating means is operated by magnetic force.

* * * * *